Sept. 2, 1924.  W. J. SCHMIDT  1,507,326
EGG SCALE
Filed July 2, 1923
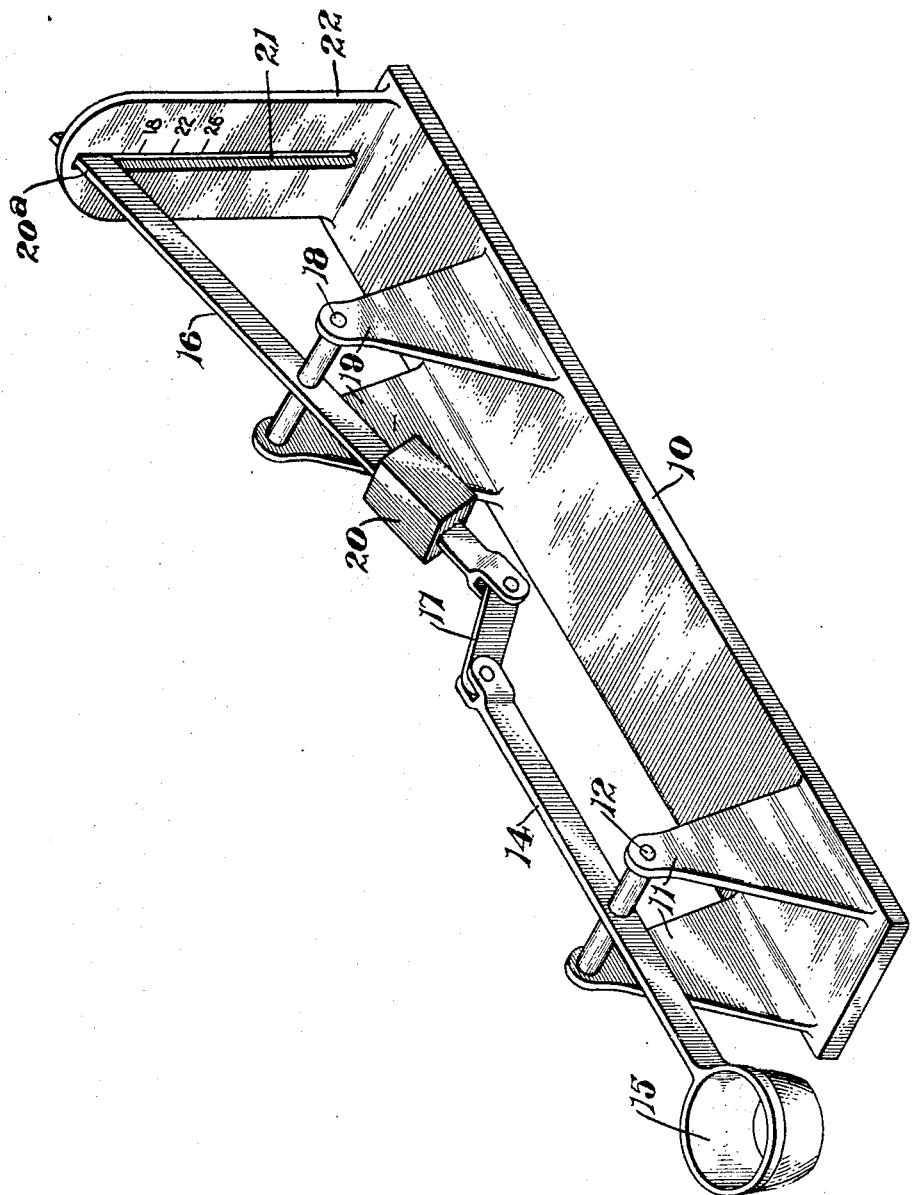
INVENTOR
WILLIAM J. SCHMIDT
BY Dewey, Strong, Townsend & Loftus.
ATTYS.

Patented Sept. 2, 1924.

1,507,326

UNITED STATES PATENT OFFICE.

WILLIAM JOHN SCHMIDT, OF SUNNYVALE, CALIFORNIA.

EGG SCALE.

Application filed July 2, 1923. Serial No. 649,034.

*To all whom it may concern:*

Be it known that I, WILLIAM JOHN SCHMIDT, a citizen of the United States, residing at Sunnyvale, county of Santa Clara, and State of California, have invented new and useful Improvements in Egg Scales, of which the following is a specification.

This invention relates to scales, particularly to the type employed in weighing and grading eggs.

At the present time eggs are generally graded by their weight per dozen and simple scales have been provided for use in weighing the eggs singly to determine their grade. The scales in general use are of the type employing a sliding balance weight the position of which must be manually adjusted by the operator to determine the weight and grade of each egg. These scales have not proven entirely satisfactory as they cannot be operated economically in the matter of time. Therefore, it is the object of the present invention to generally improve scales of the type referred to whereby to provide an efficient device of simple and inexpensive construction which may be employed to accurately and rapidly weigh eggs and indicate their grade without the necessity of manual adjustment when eggs of various weights are weighed.

One form which the invention may assume is exemplified in the following description and illustrated by way of example in the accompanying drawings, in which:

The figure is a perspective view of a device embodying the preferred form of my invention.

Referring more particularly to the accompanying drawings, 10 indicates a base plate formed with a pair of vertically extending bearings 11. A pivot pin 12 extends between the upper ends of these bearings and a scale beam 14 is fulcrumed thereon. This beam is disposed longitudinally of the base plate and its outer end is fitted with an egg receiving socket 15. The inner end of the scale beam is connected to the inner end of a fulcrumed weight arm 16 by a link 17. The weight arm is also disposed longitudinally of the base plate and is supported by a pivot pin 18 carried by bearings 19. A weight 20 is fixed on the weight arm intermediate its inner end and its fulcrum point. The outer end 20ª of the weight arm constitutes an indicator and is adapted to swing in a vertical plane in a slot 21 formed in an indicator plate 22. This plate as shown extends vertically from the base and may be marked with characters relating to the different weights or grades of eggs.

In operation, an egg to be weighed or graded is placed in the socket 15 and its weight will cause the scale beam to pivot about its fulcrum point and tend to raise the inner end of the weight beam and the weight thereon. This will be accompanied by downward swinging movement of the outer end of the weight beam, or the indicator, which will register with one of the characters on the indicator plate and indicate the weight or grade of the egg. The numerals on the indicator plate shown in the drawings indicate the number of ounces per dozen of three different grades of eggs. It is to be understood, however, that numerals indicating the exact weight of the egg or other facts may be substituted therefor.

By the use of a scale constructed according to the present invention, it is obvious that eggs may be rapidly and accurately weighed and graded and the time required in performing the operation will be reduced to a minimum.

It is obvious from the foregoing that a very simple scale has been provided which is efficient in operation and inexpensive to manufacture.

While I have shown the preferred form of my invention as now known to me, it is understood that various changes may be made in its construction without departing from the spirit of the invention as defined in the appended claims.

Having thus described my invention, what I claim and desire to secure by Letters Patent is:—

1. A scale comprising a fulcrumed scale beam at one end of which an article to be weighed may be disposed, a pivotal weight arm connected at its end to the other end of the scale beam whereby swinging movement of the scale beam will be accompanied by swinging movement of the weight arm, a weight on said arm disposed between its pivotal point and end whereby an article to be weighed placed on the end of said scale beam may raise the weight an amount in proportion to its own weight, and indicating means actuated by movement of the scale beam and weight arm to indicate the weight of an article being weighed.

2. A scale comprising a fulcrumed scale beam at one end of which an article to be weighed may be disposed, a pivotal weight arm connected at its end to the other end of the scale beam whereby swinging movement of the scale beam will be accompanied by swinging movement of the weight arm, a weight on said arm disposed between its pivotal point and end whereby an article to be weighed placed on the end of said scale beam may raise the weight an amount in proportion to its own weight, and an indicator actuated by movement of the weight arm to indicate the weight of an article being weighed.

3. A scale comprising a fulcrumed scale beam at one end of which an article to be weighed may be disposed, a pivotal weight arm connected at its end to the other end of the scale beam whereby swinging movement of the scale beam will be accompanied by swinging movement of the weight arm, a weight on said arm disposed between its pivotal point and end whereby an article to be weighed placed on the end of said scale beam may raise the weight an amount in proportion to its own weight, and an extension on said weight arm co-operating with a calibrated plate to indicate the weight of an article being weighed.

4. An egg grader comprising a fulcrumed scale beam at one end of which an egg to be graded may be disposed, a pivotal weight arm connected at its end to the end of said scale beam whereby swinging movement of the scale beam will be accompanied by swinging movement of the weight arm, a weight on said arm intermediate its pivotal point and its end, whereby an egg placed at the end of the scale beam may raise the weight and swing the weight arm an amount in proportion to the weight of the egg, and indicating means actuated by swinging movement of the weight arm to indicate the grade of the egg being graded.

5. An egg grader comprising a fulcrumed scale beam at one end of which an egg to be graded may be disposed, a pivotal weight arm connected at its end to the end of said scale beam whereby swinging movement of the scale beam will be accompanied by swinging movement of the weight arm, a weight on said arm intermediate its pivotal point and its end, whereby an egg placed at the end of the scale beam may raise the weight and swing the weight arm an amount in proportion to the weight of the egg, and an extension on said weight arm constituting an indicator and an indicator plate adjacent said extension for co-operating therewith to indicate the grade of an egg being graded.

6. An egg grader comprising a fulcrumed scale beam, an egg receiving socket at the outer end thereof into which an egg to be weighed may be placed, a pivotal weight arm, a link connecting the inner end of the weight arm to the inner end of the scale beam whereby swinging movement of the scale beam will be accompanied by swinging movement of the weight arm, a weight on said arm disposed between its pivotal point and inner end whereby an egg to be weighed placed in said socket may raise the weight an amount in proportion to its own weight, an indicator plate arranged adjacent the other end of the weight arm whereby said end of the weight arm will constitute an indicator and cooperate with said indicator plate to indicate the grade of an egg being graded.

7. An egg scale comprising a fulcrumed scale beam, an egg receiving socket at the outer end thereof into which an egg to be weighed may be placed, a fulcrumed weight arm connected at its inner end to the inner end of said beam whereby swinging movement of the scale beam caused by the weight of an egg placed in the socket will tend to swing the weight arm and raise the weight, an indicating plate adjacent the outer end of said weight arm, said weight arm constituting an indicator for co-operation with said plate to indicate the weight of the egg being weighed.

WILLIAM JOHN SCHMIDT.